United States Patent
Bremer et al.

(10) Patent No.: US 6,876,635 B2
(45) Date of Patent: Apr. 5, 2005

(54) CURRENT REDUCTION BY RECEIVER LINEARITY ADJUSTMENT IN A COMMUNICATION DEVICE

(75) Inventors: Brian H. Bremer, Arlington Heights, IL (US); Jeremy A. Jacobson, Bothell, WA (US); Lawrence R. Schumacher, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 439 days.

(21) Appl. No.: 10/011,603

(22) Filed: Nov. 5, 2001

(65) Prior Publication Data

US 2003/0086383 A1 May 8, 2003

(51) Int. Cl.[7] ............................................. G08C 17/00
(52) U.S. Cl. ...................... 370/311; 370/310; 370/311; 340/7.32; 340/7.38; 455/38.3; 455/343; 455/234.1
(58) Field of Search ................................ 370/310, 311; 340/7.32–7.38; 455/38.3, 343, 234.1

(56) References Cited

U.S. PATENT DOCUMENTS

| | | | | |
|---|---|---|---|---|
| 4,275,362 A | * | 6/1981 | Harford | ..................... 330/283 |
| 5,001,776 A | * | 3/1991 | Clark | ....................... 455/226.2 |
| 5,179,724 A | * | 1/1993 | Lindoff | ....................... 455/76 |
| 5,222,076 A | | 6/1993 | Ng et al. | |
| 5,392,287 A | | 2/1995 | Tiedemann, Jr. et al. | |
| 5,465,269 A | * | 11/1995 | Schaffner et al. | ........... 375/144 |
| 5,570,369 A | | 10/1996 | Jokinen | |
| 5,815,821 A | * | 9/1998 | Pettersson | .................... 455/574 |
| 5,881,368 A | * | 3/1999 | Grob et al. | ................... 455/69 |
| 6,016,312 A | | 1/2000 | Storm et al. | |
| 6,026,288 A | * | 2/2000 | Bronner | ..................... 455/343 |
| 6,282,177 B1 | * | 8/2001 | Ostermiller et al. | ........ 370/278 |
| 6,311,048 B1 | * | 10/2001 | Loke | ....................... 455/245.1 |

FOREIGN PATENT DOCUMENTS

| | | |
|---|---|---|
| WO | WO94/10812 | 3/1994 |
| WO | WO96/03811 | 2/1996 |

\* cited by examiner

*Primary Examiner*—Huy D. Vu
*Assistant Examiner*—Daniel Ryman
(74) *Attorney, Agent, or Firm*—Brian M. Mancini

(57) ABSTRACT

A method for reducing current drain in a communication device includes a step of determining when the communication device is transmitting. A next step includes lowering the current level to the receiver when communication device is not transmitting. A next step includes raising the current level to the receiver when communication device is transmitting. Changing the current level alters the linearity of the receiver. As a result, the communication device reduces power consumption while operating in a traffic channel. The system is applicable to full duplex systems such as code division multiple access (CDMA) systems.

11 Claims, 2 Drawing Sheets

CURRENT REDUCTION BY RECEIVER LINEARITY ADJUSTMENT IN A COMMUNICATION DEVICE

FIELD OF THE INVENTION

The present invention generally relates to reducing power consumption in a communication device such as a radiotelephone. More particularly, the present invention relates to a method for receiver linearity adjustment in a Code Division Multiple Access (CDMA) radiotelephone device.

BACKGROUND OF THE INVENTION

Many communication devices operate on battery power. The radiotelephones in use today are almost all portable devices utilizing rechargeable batteries that need periodic recharging. The size of the battery and the power efficiency of the communication device determine the amount of talk time available to a user. As a convenience to a user, it has always been desirable to extend the life of the battery to provide longer talk times. However, even with current devices, communications are occasionally interrupted, requiring the recharging of the battery or replacement with a freshly recharged battery. Therefore, it has been desirable to extend the battery life on a communication device.

In most cases, the largest drain on battery power is the transmitter of the communication device, followed by the receiver. The transmitter, or more specifically the power amplifier of the transmitter, in a communication device has typically been configured so that it only draws power when the user wishes to transmit. As the user controls the transmission time, and the amount of power transmitted is controlled by standard, the current drain drawn on a battery from the transmitter circuit has already been limited to those times and amounts that are strictly necessary for communication. However, the power used by the receiver is less controlled. For example, the receiver must be ready to receive an incoming call that may occur at any time. For this to happen, the receiver must be on, drawing power, and ready to receive.

Receiver operation is different in different operating systems. For example, in Time Division Multiple Access (TDMA) systems or Global System for Mobile (GSM) communication systems, the receiver operation is time-gated such that it is powered down (sleeps) during those known times when messages can not be received (i.e. no messages can be transmitted). In other words, the receiver only operates at a particular time when messages can be received. Other communication systems, in practice, may require the receiver to be on continuously. One example of such a specification is Telecommunications Industry Association/Electronic Industry Association (TIA/EIA) Interim Standard Is 95, "Mobile Station-Base Station Compatibility Standard for Dual-Mode Wideband Spread Spectrum Cellular System" (IS-95). IS-95 defines a direct sequence code division multiple access (DS-CDMA or CDMA) radiotelephone system. In a CDMA system, the communication device can transmit in a gated fashion, depending on the requited data to be transmitted. In addition, bursting the transmitter decreases battery current drain, increasing talk time. However, due to the full duplex nature of CDMA, the receiver must be on continuously in order to receive incoming data while on a traffic channel.

One prior art method to reduce some receiver on-time in a CDMA system is slotted paging mode. Slotted paging mode is a special form of discontinuous reception (DRX) operation for a battery-operated mobile radio such as a cellular radiotelephone while in paging mode. In slotted paging mode, when the radiotelephone is in an idle mode (i.e., not engaged in a call), the radiotelephone does not continuously monitor a paging channel. The goal of slotted paging mode operation is to reduce the on-time of the radio during paging mode by powering-off portions of the radio, such as the receiver, during idle (sleep) periods. In the idle state, the radiotelephone wakes up only during slots preassigned by the radiotelephone system or to process some other condition, such as a user input. However, this type of receiver operation is only operable in paging mode, and requires resynchronization procedures to be implemented upon powering-up the receiver. Moreover, a timing reference must be maintained during these sleep modes, which itself dissipates power. Further, the radiotelephone may also be required to wake up to process or respond to other events occurring asynchronously in the radio, in addition to exiting a sleep mode during assigned slots. None of these address receiver power control during calls.

Accordingly, there is a need for a method and apparatus for reducing current drain in a communication device such as a radiotelephone while operating on a traffic channel. There is a further need to reduce the current drain by the receiver in a communication device operating in a CDMA system, without sacrificing the ability to receive incoming signals. It would also be of benefit to provide these advantages without additional hardware, which would increase the cost of the communication device.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

The present invention reduces the current drain in the receiver by making the elements in the receiver (amplifiers and down converters) less linear when the radio is not transmitting, and increasing linearity again when the radio is transmitting. The receiver stays on, however, unlike the TDMA or GSM counterpart. The radio uses the knowledge of whether it is transmitting or not, and the received signal strength to properly set the receiver. In particular, the level of the received signal is obtained by the Receive Signal Strength Indicator (RSSI) in the radiotelephone.

Figure 1:
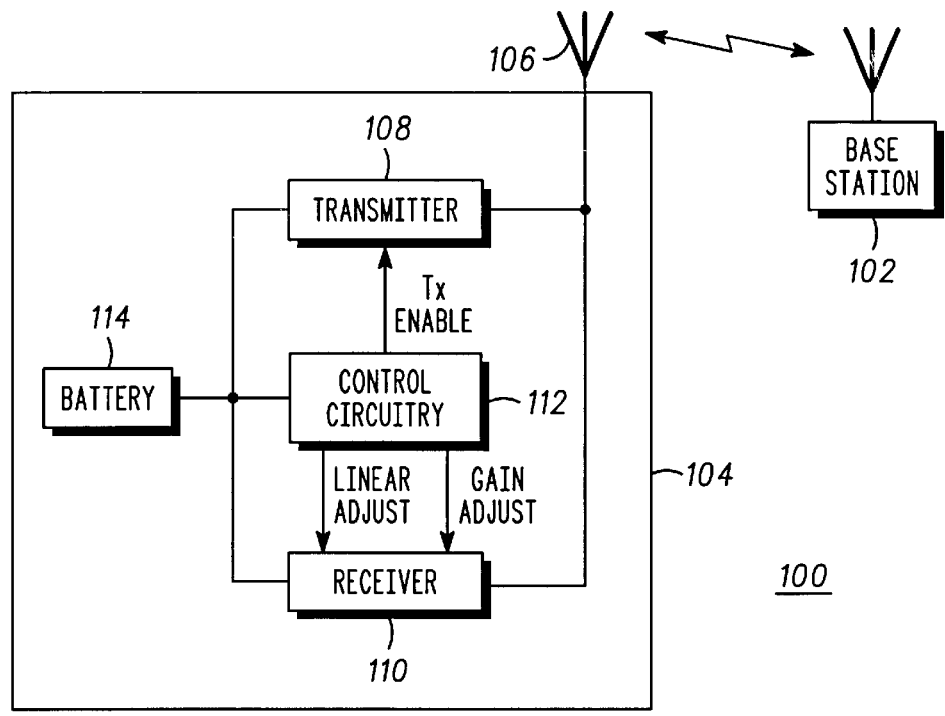
FIG. 1 is a simplified schematic diagram of a communication device, in accordance with the present invention.

Referring now to FIG. 1, a radiotelephone system 100 includes a plurality of base stations such as base station 102 configured for radio communication with one or more mobile stations including a Code Division Multiple Access (CDMA) radiotelephone such as radiotelephone 104. The radiotelephone 104 is configured to receive and transmit direct sequence code division multiple access (DS-CDMA) signals to communicate with the plurality of base stations, including base station 102. In the illustrated embodiment, the radiotelephone system 100 is a CDMA radiotelephone system operating according to TIA/EIA Interim Standard IS-95, "Mobile Station-Base Station Compatibility Standard for Dual-Mode Wideband Spread Spectrum Cellular System," operating at 800 MHz. Alternatively, the radiotelephone system 100 could operate in accordance with other CDMA systems including PCS systems at 1800 MHz or with any other suitable digital radiotelephone systems.

The radiotelephone 104 includes an antenna 106 coupled to a transmitter 108 and receiver 110. It should be recognized that there are many other devices necessary in the operation of the radiotelephone that are not shown, to avoid confusion. The transmitter 108 and receiver 110 are coupled to, and controlled by, control circuitry 112, such as a microprocessor, microcontroller, DSP, or other similar control device. A battery 114 provides operating power to the other components of the radiotelephone 104. Preferably, the battery is rechargeable.

The antenna 106 receives RF signals from the base station 102 and from other base stations in the vicinity. Received RF signals are converted to electrical signals by the antenna 106 and provided to the receiver 110 to provide conversion to baseband signals. The receiver 110 includes an amplifier and other circuitry, such as RF circuits and demodulation circuitry, as is known in the art. The baseband signals are provided to the other circuits (not shown) in the radiotelephone 104, which converts them to streams of digital data for further processing.

Similarly, the radiotelephone 104 provides baseband signals through modulation circuitry (not shown) to the transmitter 108, which sends electrical RF signals to the antenna 106 for transmission to the base station 102 and other base stations in the vicinity. Typically, amplifiers consume the most power in transmitter and receiver circuits.

The control circuitry 112 controls the functions of the radiotelephone 104. The control circuitry 112 operates in response to stored programs of instructions and includes a memory (not shown) for storing these instructions and other data. The control circuitry 112 is also coupled to other elements of the radiotelephone 104. Such connections are not shown in FIG. 1, so as to not unduly complicate the drawing. For example, the radiotelephone will typically include a user interface to permit user control of the operation of the radiotelephone 104. The user interface typically includes a display, a keypad, a microphone and an earpiece. The user interface is coupled to the control circuitry 112.

Since IS-95 CDMA is a full duplex system, the receiver 110 is enabled at all times, which is a constant current drain on the battery 114 of the radiotelephone 104. This shortens the life of the charge in the battery. The transmitter 108, on the other hand, is gated off based on the required bandwidth of the transmitted signal. In typical phone conversation, the transmitter is enabled only about 40% of the time. This gating of the transmitter results in a reduction in the total transmit current used, since much of (or all) of the transmitter circuitry can be disabled during the gated off periods.

The present invention defines a method to reduce the receiver current during periods in which the transmitter is gated off, thus reducing the overall current consumption for the communication device. In particular, the present invention provides for current reduction to a receiver during actual communication, i.e. when using a traffic channel. In contrast, prior art techniques addressing receiver power consumption are concerned with monitoring pilot or paging channels where periodic messages and control signals are scheduled, but not traffic channels during an actual communication (telephone call), as in the present invention.

Figure 2:
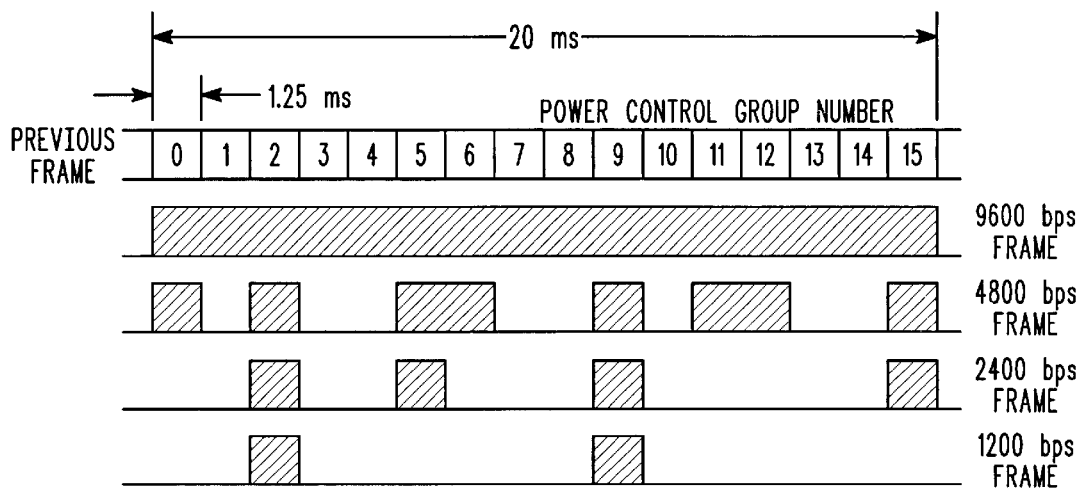
FIG. 2 is a timing diagram of transmitter power control gating, in accordance with the present invention.

FIG. 2 shows the transmitter gating for different bandwidths in the CDMA system. The CDMA system provides information transfer in 20 millisecond (ms) frames, consisting of sixteen power control groups (PCG) wherein transmit power can be adjusted. When a bandwidth of 9600 bits per second (bps) is required, the transmitter is operated almost continually (non-burst mode). Whereas, when a lesser bandwidth is required (burst mode) the transmitted can be occasionally gated off. For example, at 1200 bits per second (bps), the transmitter is gated off for seven out of eight PCGs.

To operate within the IS-95 standard, a CDMA Receiver must meet the specifications for two-tone intermodulation (IM) and single-tone desensitization (STD) defined in TIA/EIA-98. These two requirements set the linearity requirement for the receiver front end, which in turn sets its power consumption. The IM specification requires that the receiver front end be linear enough to reject an on-channel third-order modulation product of two equally spaced continuous wave interferers. Further, the STD specification requires that the receiver front end be linear enough to reject an on-channel cross-modulation product of a continuous wave interferer and the radio's own transmit signal. The linearity requirement to meet STD is much more strenuous than the requirement to meet IM, and thus sets the receiver's current consumption. However, when the transmitter is gated off, the STD linearity requirement is removed since there can be no self-transmit interference, and the current can be scaled back, in accordance with the present invention, to a lower level required to meet the IM specification alone.

Figure 3:
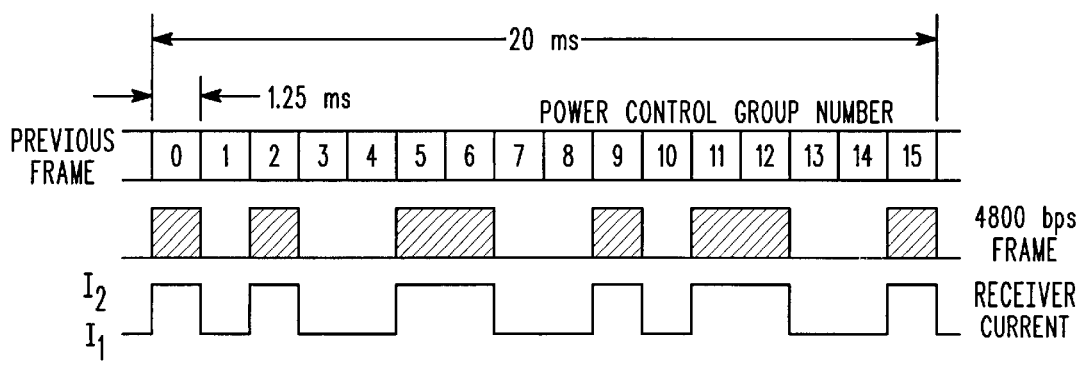
FIG. 3 is a timing diagram of receiver current control, in accordance with the present invention.

FIG. 3 shows the current variations in the receiver, using a bandwidth of 4800 bps frame for example, in accordance with the present invention. In this example, the receiver current is raised to a higher (nominal) level, $I_2$, when the transmitter is gated on, in order to increase linearity to meet the STD specification (along with the IM specification). When the transmitter is gated off, the receiver current is dropped to a lower level, $I_1$, sufficient for meeting the IM specification alone while saving power. Advantageously, this results in less battery drain. In particular, the lower the bandwidth required, the more battery current is saved by down-powering the receiver.

Referring back to FIG. 1, the gating of the transmitter 108 is controlled in hardware by the control circuitry 112. A gating signal, Tx Enable, is used to enable the transmitter circuitry, and in particular a power amplifier of the transmitter 108, during those power control groups in which data is to be transmitted. This same signal is used to drive the power consumption change of the receiver 110. Whenever the transmitter is enabled, the power consumption (and thus the linearity) of the receiver front end is increased to meet the STD specification. This results in a two tier current signature (as represented in FIG. 3). Although two receiver current levels, $I_1$ and $I_2$, have been discussed above, a more complex implementation is envisioned wherein the current level, $I_2$, can be variable such that the power consumption of the receiver is a function of transmitter power. In other words, receiver power can be adjusted to just meet the STD specification, which is dependent on transmit power. In particular, receiver power can be tailored for each power control group in the frame where the radiotelephone is transmitting. More particularly, receiver power tracks individual transmitter bursts.

In practice, most prior art receiver circuits utilize constant current amplifiers coupled with variable attenuators to change power levels. In such case, the current drain of the receiver is constant, regardless of power level. To achieve the improvement provided by the present invention, a receiver front end that allows a dynamic adjustment of the receiver power consumption for a given receive signal strength is used. In the present invention, the linearity of the receiver 110 is controlled by a linear adjust signal from the control circuitry 112. The linear adjust signal control the current flow to the receiver 110, and in particular the bias current to the receiver power amplifier. Alternatively, the linear adjust signal can control the operating voltage of the receiver 110 and receiver power amplifier. The control circuitry, also provides a gain adjust signal to the receiver 110.

The gain adjust is independent of the linearity adjust and does not depend on current limiting. The gain required in the receiver is independent of whether the communication device is transmitting. It is only dependent on the strength of the incoming signal. In practice, the receiver has four gain states depending on the received signal strength and whether the communication device is transmitting or not. The four states are: High Gain with High Linearity, High Gain with Low Linearity, Mid Gain, and Low Gain. The mid and low gain states both use low linearity because, at these equivalent receive levels, the transmit power is low. The gain state is set depending on the strength of the incoming signal. At low receive signal levels, the receiver is in its high gain state and the transmitter is at high power (about 15 dBm or higher). At high gain, the receiver is more susceptible to interference and control of the receiver linearity becomes important, as described previously. Increasing the receiver linearity (forcing the gain slope to be a straight line at high incoming RF levels) requires the receiver to use more current. Since the communication device requires this higher linearity only when transmitting, the linearity (and current) can be reduced when the radio is not transmitting. The present invention allows the receiver to reduce linearity in non-full rate transmissions to lower the current draw.

Figure 4:
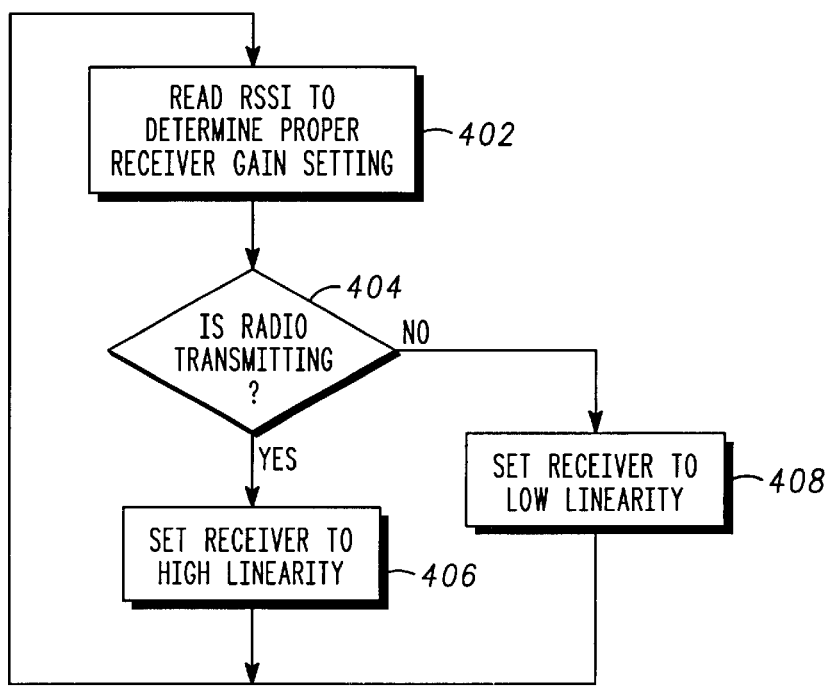
FIG. 4 is a flow chart for a method of reducing current drain in a receiver, in accordance with the present invention.

FIG. 4 is a flow diagram illustrating operation of the radiotelephone 104 of FIG. 1 for changing receiver linearity. FIG. 4 will be described in conjunction with FIG. 2 and FIG. 3, which is a timing diagram illustrating transmitter and receiver power control in the radiotelephone during operation, in accordance with the present invention.

At step 402, the radiotelephone receives a CDMA signal from a base station and measures an indication of received signal strength (RSSI). The radiotelephone then determines the proper gain setting for the receiver to properly receive the signal. At this time, the radiotelephone and base station can begin a full duplex communication. This includes the radiotelephone both transmitting and receiving. At step 404, the radiotelephone determines when it is transmitting. Transmitting may interfere with reception (STD) over the interference due to IM distortion, and requires the receiver to be operating in a linear mode at a higher power. Therefore, the present invention provides a step for operating 406 the receiver at a higher linearity while transmitting, or operating 408 the receiver at a lowering linearity and power consumption when not transmitting. These steps are repeated at least once for each power control group in a CDMA frame. Alternative, linearity and power consumption can dynamically trace the transmit power level to provide suitable receiver sensitivity while meeting the STD and IM specifications.

The present invention can also advantageously be applied to access probes in addition to the traffic channel that is described above. Access probes occur when the radio communication device is registering with the base station, call origination and call termination. In these cases, the radio communication device transmits data bursts to the base station during the access probes with transmit power continually increasing until the base station responds or a set number of probes have been made. During these transmit times the receiver linearity can be adjusted in the same manner described previously.

As can be seen from the foregoing, the present invention provides a method and apparatus for reducing the current drain in a communication device by making the elements in the receiver (amplifiers and down converters) less linear when the radio is not transmitting, and increasing linearity again when the radio is transmitting. This is accomplished by the supply of current to these devices. The radio uses the knowledge of whether it is transmitting or not, and the received signal strength to set the current available to the receiver.

While a particular embodiment of the present invention has been shown and described, modifications may be made. It is therefore intended in the appended claims to cover all such changes and modifications which fall within the broad scope of the invention.

What is claimed is:

1. A method for reducing current drain in a communication device operating on a traffic channel in a code division multiple access (CDMA) system, the method comprising the steps of:

enabling the receiver;

determining when the communication device is transmitting;

measuring a received signal strength and measuring a level of the transmitter power if the transmitter is gated on;

lowering a bias current level to a preset level to operate the receiver in a non-linear mode and adjusting a receiver power amplifier gain level only dependent upon the received signal strength when the communication device is not transmitting; and raising the bias current level to the receiver to operate the receiver in a linear mode with the current level dynamically dependent upon the transmitter power and adjusting a receiver power amplifier gain level dependent upon the received signal strength when the communication device is transmitting and keeping the bias current low if the gain level is at a nominal or lower state dependent upon the received signal strength.

2. A method as recited in claim 1, wherein the raising step includes operating the bias current and gain at levels to meet intermodulation and crossmodulation requirements and the lowering stop includes operating the bias current and gain at levels to meet intermodulation requirements.

3. A method as recited in claim 1, wherein the determining step is performed at least once for each power control group in a frame of information being transferred.

4. A method as recited in claim 1, further comprising the step of operating the communication device in an access probe mode wherein the communication device is attempting registration with a base station.

5. A method for reducing current drain in a communication device operating on a traffic channel in a code division multiple access (CDMA) system, the method comprising the steps of:

enabling the receiver;

determining when the communication device is transmitting;

measuring a received signal strength and measuring a level of the transmitter power if the transmitter is gated on;

lowering a bias current level to a preset level to operate the receiver in a non-linear mode and adjusting a receiver power amplifier gain level only dependent upon the received signal strength when die communication device is not transmitting such that the communication device meets intermodulation requirements; and raising the bias current level to the receiver to operate the receiver in a linear mode with the current level dynamically dependent upon the transmitter power and if a received signal strength is within a predetermined range from the transmitted power, adjusting a receiver power amplifier gain level dependent upon the received signal strength when the communication device is transmitting and keeping the bias current low if the gain level is at a nominal or lower state dependent upon the received signal strength such that the communication device meets intermodulation and crossmodulation requirements.

6. A method as recited in claim 5, wherein the raising step includes four categories of the group consisting of; a high gain/high current state if a received signal is outside of the predetermined range to meet the crossmodulation requirements, a high gain/low current state if a received signal is within the predetermined range to meet the intermodulation requirements, a mid gain/low current state, and a low gain/low current state.

7. A method as recited in claim 5, wherein the determining step is performed at least once for each power control group in a frame of information being transferred.

8. A communication device with reduced current drain on a CDMA traffic channel, the communication device comprising:

a transmitter operable to be gated off and to be gated on while incorporating a variable transmit power level;

a receiver operable at a variable receive bias current and voltage gain levels, the receiver is always on during communication; and a control circuit coupled to the transmitter and receiver, the control circuit operable to measure a received signal strength and to control the receiver linearity, wherein when the transmitter is operating the control circuit directs the receiver to operate in a linear mode with the current level dynamically dependent upon transmitter power and at a receiver power amplifier gain level only dependent upon the received signal strength and keeps the bias current low if the gain level is at a nominal or lower state dependent upon the received signal strength, and when the transmitter is not operating the control circuit directs the receiver to operate at a preset current level in a non-linear mode and at a receiver power amplifier gain level dependent upon the received signal strength.

9. A communication device as recited in claim 8 wherein the control circuit of the communication device is operable to control the receiver linearity by changing the receiver power consumption to operate the bias current and gain at levels to meet intermodulation requirements when the transmitter is gated off, and operating the bias current and gain at levels to meet intermodulation and crossmodulation requirements when the transmitter is gated on.

10. A communication device as recited in claim 8 wherein the control circuitry performs the power control of the receiver at least once for each power control group in a frame of information being transferred.

11. A communication device as recited in claim 8, wherein the communication device is operable in an access probe mode during an attempt to register with a base station.

* * * * *

UNITED STATES PATENT AND TRADEMARK OFFICE
CERTIFICATE OF CORRECTION

PATENT NO.    : 6,876,635 B2
DATED         : April 5, 2005
INVENTOR(S)   : Bremer, Brian et al.

It is certified that error appears in the above-identified patent and that said Letters Patent is hereby corrected as shown below:

Column 6,
Line 52, delete "stop" and replace with -- step --

Column 7,
Line 7, delete "die" and replace with -- the --

Signed and Sealed this

Twenty-eighth Day of June, 2005

JON W. DUDAS
*Director of the United States Patent and Trademark Office*